United States Patent
Hashimoto et al.

(10) Patent No.: US 7,206,996 B2
(45) Date of Patent: Apr. 17, 2007

(54) PORTAL SITE PROVIDING SYSTEM

(75) Inventors: Ichiro Hashimoto, Kanazawa (JP);
Yoshitaka Hayashi, Kanazawa (JP);
Yukihiro Matsubara, Kanazawa (JP);
Kazuko Hayashi, Kanazawa (JP);
Yasuko Yamauchi, Kanazawa (JP);
Tetsunari Kawaguchi, Kanazawa (JP);
Yoko Yamamoto, Kanazawa (JP);
Hisaki Yokogawa, Kanazawa (JP)

(73) Assignee: Fujitsu Limited, Kawasaki (JP)

( * ) Notice: Subject to any disclaimer, the term of this patent is extended or adjusted under 35 U.S.C. 154(b) by 502 days.

(21) Appl. No.: 10/079,544

(22) Filed: Feb. 22, 2002

(65) Prior Publication Data

US 2002/0184298 A1 Dec. 5, 2002

(30) Foreign Application Priority Data

May 29, 2001 (JP) ............................ 2001-160020

(51) Int. Cl.
*G06F 15/00* (2006.01)
*G06F 17/00* (2006.01)

(52) U.S. Cl. ................. 715/501.1; 715/500; 715/500.1; 715/511; 715/513; 715/530

(58) Field of Classification Search ............. 715/500.1, 715/501.1, 511, 513, 530, 526, 500
See application file for complete search history.

(56) References Cited

U.S. PATENT DOCUMENTS

| | | | |
|---|---|---|---|
| 5,978,828 A * | 11/1999 | Greer et al. ................ | 709/224 |
| 6,061,686 A * | 5/2000 | Gauvin et al. ............... | 707/10 |
| 6,313,855 B1 * | 11/2001 | Shuping et al. ............ | 715/854 |
| 6,321,242 B1 * | 11/2001 | Fogg et al. ................ | 715/513 |
| 6,377,957 B1 * | 4/2002 | Jeyaraman .................. | 707/200 |
| 6,605,120 B1 * | 8/2003 | Fields et al. ............... | 715/513 |
| 2001/0021917 A1 * | 9/2001 | Hatano ........................ | 705/26 |
| 2002/0052954 A1 * | 5/2002 | Polizzi et al. .............. | 709/225 |
| 2002/0054114 A1 * | 5/2002 | Shuping et al. ............ | 345/764 |
| 2002/0075297 A1 * | 6/2002 | Boulter ...................... | 345/736 |
| 2002/0152245 A1 * | 10/2002 | McCaskey et al. ........ | 707/530 |
| 2003/0041094 A1 * | 2/2003 | Lara et al. .................. | 709/201 |
| 2003/0236771 A1 * | 12/2003 | Becker ........................ | 707/2 |

* cited by examiner

*Primary Examiner*—Heather R. Herndon
*Assistant Examiner*—Chau Nguyen
(74) *Attorney, Agent, or Firm*—Staas & Halsey LLP

(57) ABSTRACT

A portal site providing machine 20 obtains web pages provided by websites A–E at regular time intervals, and compares the latest web pages with the old web pages obtained last time. Then, the item-by-item comparison is made between the latest and old web pages to determine the degree of updating of the contents. The portal site providing machine 20 provides a portal page which contains images representing respective sites A–E with corresponding size and arrangement according to the degrees of updating.

21 Claims, 17 Drawing Sheets

FIG.10

《WEBSITE A》

| ITEM | WEIGHT | RESULT OF COMPARISON | SUBTOTAL | DEGREE OF CHANGE |
|---|---|---|---|---|
| DATE OF UPDATING | 3 | 1 | 3 | 7 |
| TOTAL SIZE | 2 | 1 | 2 | |
| TEXT ENTITY | 2 | 1 | 2 | |
| NUMBER OF IMAGES | 1 | 0 | 0 | |
| IMAGE SIZE | 2 | 0 | 0 | |
| GENERAL PATTERN | 3 | 0 | 0 | |

FIG.12

《WEBSITE B》

| ITEM | WEIGHT | RESULT OF COMPARISON | SUBTOTAL | DEGREE OF CHANGE |
|---|---|---|---|---|
| DATE OF UPDATING | 3 | 1 | 3 | 12 |
| TOTAL SIZE | 2 | 1 | 2 | |
| TEXT ENTITY | 2 | 1 | 2 | |
| NUMBER OF IMAGES | 1 | 0 | 0 | |
| IMAGE SIZE | 2 | 1 | 2 | |
| GENERAL PATTERN | 3 | 1 | 3 | |

FIG.14

《WEBSITE C》

| ITEM | WEIGHT | RESULT OF COMPARISON | SUBTOTAL | DEGREE OF CHANGE |
|---|---|---|---|---|
| DATE OF UPDATING | 3 | 0 | 0 | 0 |
| TOTAL SIZE | 2 | 0 | 0 | |
| TEXT ENTITY | 2 | 0 | 0 | |
| NUMBER OF IMAGES | 1 | 0 | 0 | |
| IMAGE SIZE | 2 | 0 | 0 | |
| GENERAL PATTERN | 3 | 0 | 0 | |

FIG.16

《WEBSITE D》

| ITEM | WEIGHT | RESULT OF COMPARISON | SUBTOTAL | DEGREE OF CHANGE |
|---|---|---|---|---|
| DATE OF UPDATING | 3 | 0 | 0 | |
| TOTAL SIZE | 2 | 0 | 0 | |
| TEXT ENTITY | 2 | 0 | 0 | 0 |
| NUMBER OF IMAGES | 1 | 0 | 0 | |
| IMAGE SIZE | 2 | 0 | 0 | |
| GENERAL PATTERN | 3 | 0 | 0 | |

FIG.18

《WEBSITE E》

| ITEM | WEIGHT | RESULT OF COMPARISON | SUBTOTAL | DEGREE OF CHANGE |
|---|---|---|---|---|
| DATE OF UPDATING | 3 | 1 | 3 | 13 |
| TOTAL SIZE | 2 | 1 | 2 | |
| TEXT ENTITY | 2 | 1 | 2 | |
| NUMBER OF IMAGES | 1 | 1 | 1 | |
| IMAGE SIZE | 2 | 1 | 2 | |
| GENERAL PATTERN | 3 | 1 | 3 | |

FIG.19

| WEBSITE NAME | DEGREE OF CHANGE |
|---|---|
| WEBSITE A | 7 |
| WEBSITE B | 12 |
| WEBSITE C | 0 |
| WEBSITE D | 0 |
| WEBSITE E | 13 |

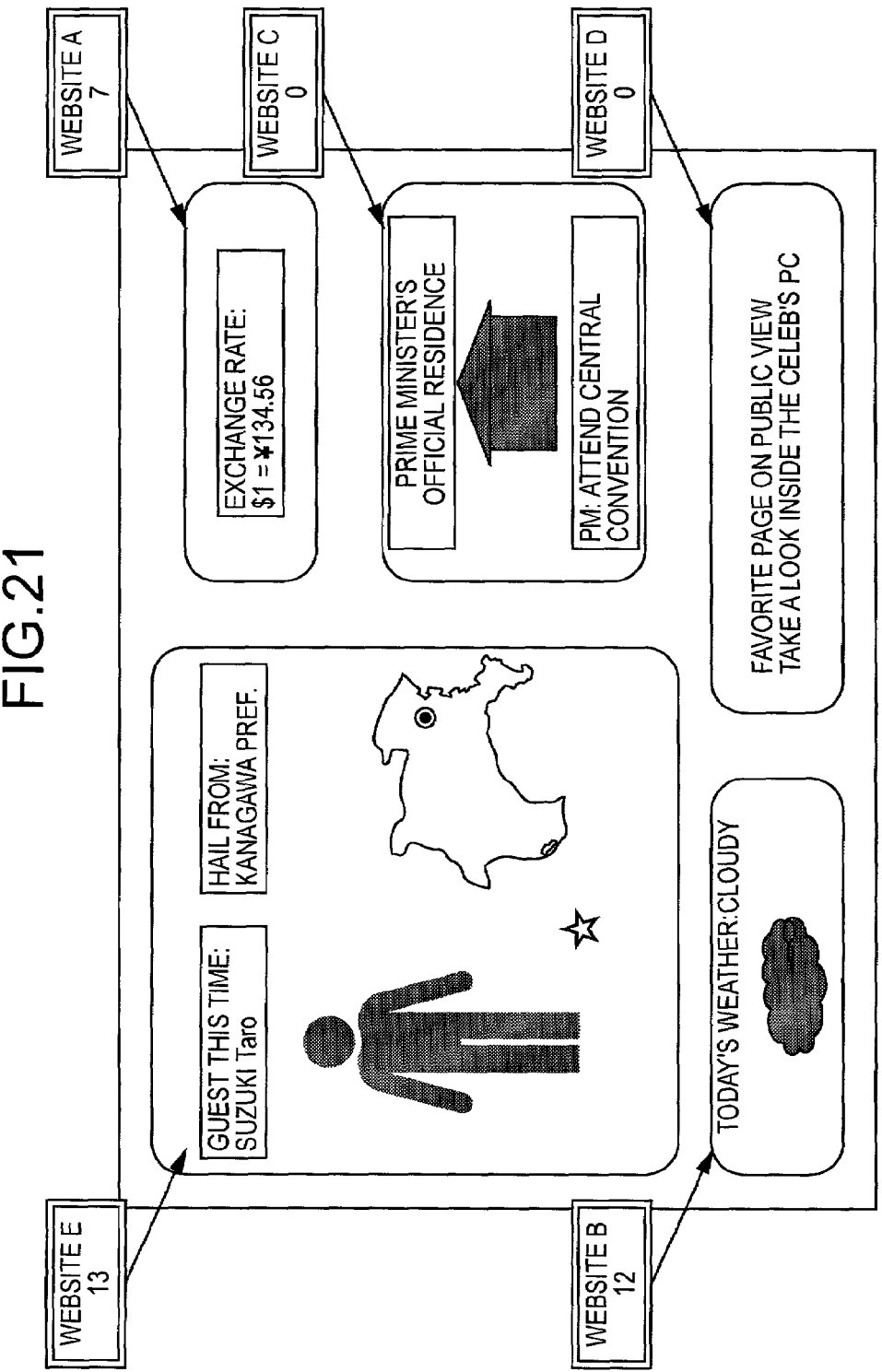

PORTAL SITE PROVIDING SYSTEM

BACKGROUND OF THE INVENTION

1. Field of the Invention

The present invention relates to a portal site providing system that provides a portal site for users who browse web pages. The present disclosure relates to subject matter contained in Japanese Patent application No. 2001-160020 (filed on May 29, 2001), which is expressly incorporated herein by reference in its entirety.

2. Description of the Related Art

For obtaining information from websites of WWW(World Wide Web), users operate their computers in which web browser programs are installed to access web server computers where websites exist. Each website updates data on its own timing different from others in most cases. The users therefore should access the websites at frequent intervals to obtain the latest information. Note that each website is unable to detect the updating frequencies of other websites quantitatively. It is useless that the users repeatedly access websites whose contents have not been updated.

SUMMARY OF THE INVENTION

It is a primary object of the present invention to provide a portal site providing system which obtains degrees of change in the websites quantitatively and provides users with guidance on the basis of the degree of change obtained. The degree of change may be notified to each website quantitatively.

To accomplish the above object, according to one aspect of the present invention, the portal site providing system comprises a server computer connectable to computers for websites each providing web data and a client computer used for a web browser, and controls the same server computer to execute: a step of storing information about the websites browsed by the client computer; a first obtaining step of obtaining first web data of the websites based on the information; a second obtaining step of obtaining second web data of the same websites based on the information after the first obtaining step; a step of determining degrees of change representing degrees of updating of the respective websites web data by comparing the first and second web data obtained in the first and second obtaining step, respectively; and a step of generating web data for a portal site in which the second web data obtained in the second obtaining step is arranged in order according to the degrees of change determined in the determining step.

With this configuration, the web data in the websites to be browsed by a user is arranged in a portal page, presented based on web data for a portal site, in order according to the degrees of change. In the portal page, images of the respective sites' web data may be displayed with corresponding size and arrangement prescribed based on the degrees of change.

BRIEF DESCRIPTION OF THE DRAWINGS

The invention will be described below in detail with reference to the accompanying drawings, in which:

FIG. 10 is an explanatory diagram showing determination of the degree of change concerned with the website A;

FIG. 12 is an explanatory diagram showing determination of the degree of change concerned with the website B;

FIG. 14 is an explanatory diagram showing determination of the degree of change concerned with the website C;

FIG. 16 is an explanatory diagram showing determination of the degree of change concerned with the website D;

FIG. 18 is an explanatory diagram showing determination of the degree of change concerned with the website E;

FIG. 19 is a schematic diagram showing the websites' degrees of change;

FIG. 21 is a schematic diagram showing a new portal page.

DESCRIPTION OF THE PREFERRED EMBODIMENT

Figure 1:
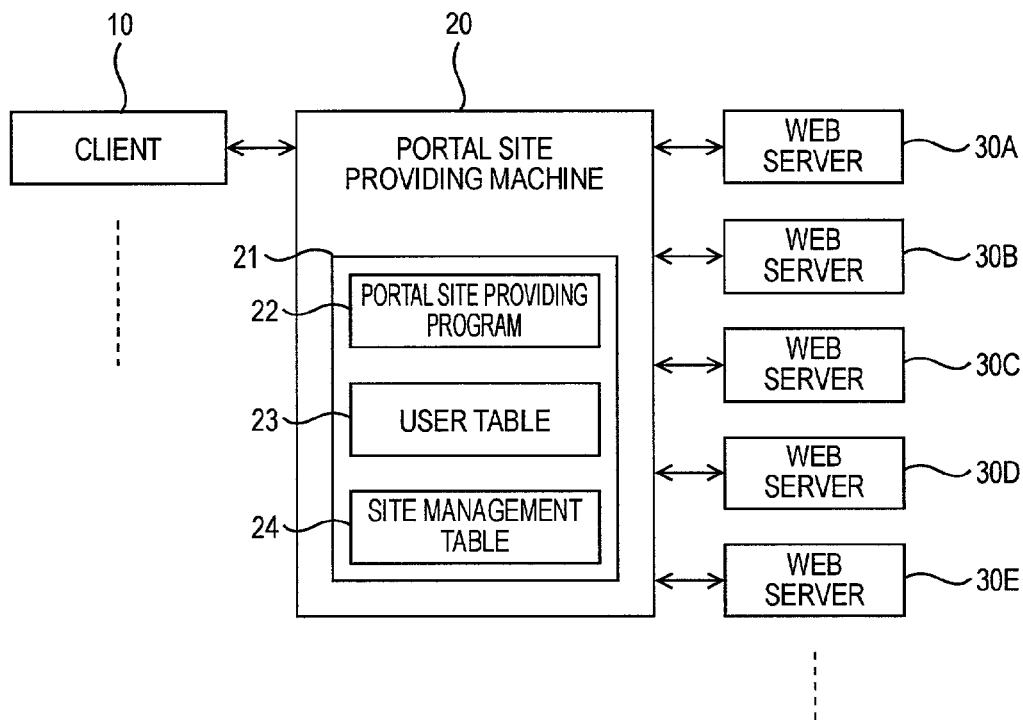
FIG. 1 is a diagram showing a system architecture in one embodiment of the present invention.

One embodiment of the present invention will hereinafter be described with reference to the accompanying drawings. FIG. 1 is a diagram showing a system architecture in this embodiment. This system comprises users' client machines 10, a portal site providing machine 20, and web server machines 30A–30E.

The client machines 10 are personal computers where web browser programs are installed, and connectable to the portal site providing machine 20 via the Internet. According to the actual configuration, many client machines 10 are connectable to the portal site providing machine 20, though only one client machine 10 is illustrated in FIG. 1.

The portal site providing machine 20 is a server computer having a hard disk drive (HDD) 21 in which a portal site providing program 22 is installed. The portal site providing program 22 comprises a web server program module and a server-side program module. The portal site providing machine 20 executes this portal site providing program 22 to make each client machine 10 display a web page used as a portal page.

Further, the portal site providing machine 22 is connected to the web server machines 30A–30E having hard disk drives stored with web server programs and web data to operate respective websites A–E.

Figure 2:
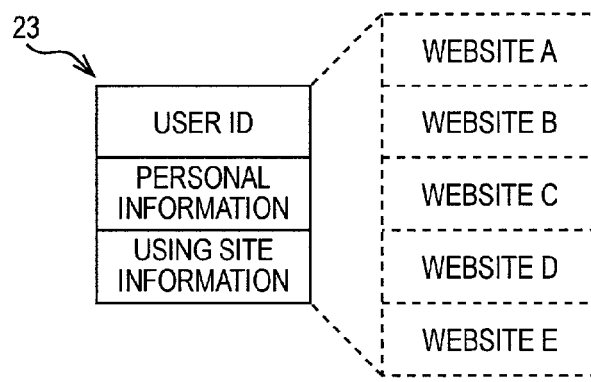
FIG. 2 is a schematic diagram showing a user table.

Moreover, the HDD 21 of the portal site providing machine 20 is stored with a user table 23 and a site management table 24. FIG. 2 is a schematic diagram showing the user table 23. This user table 23 has records each corresponding to a user and having "user ID," "personal information," and "using site information" fields.

The "user ID" field contains a user ID uniquely corresponding to the user. The "personal information" field contains the personal information or the password and the address of the user. The "using site information" field contains names of websites registered by the user. Note that users have registered names of favorite websites, browsed frequently by them, as using site information with the portal site providing machine 20. According to the example shown in FIG. 2, sites A–E provided by web server machine 30A–30E respectively are registered. Instead of the name of the website, the URL (Uniform Resource Locator) of the same website may be registered.

Figure 3:
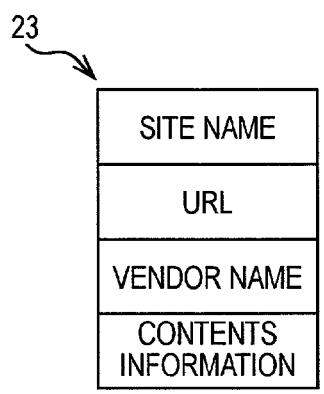
FIG. 3 is a schematic diagram showing a site management table

FIG. 3 is a schematic diagram showing the site management table 24. The site management table 24 has records each corresponding to a website and having "site name," "URL," "vendor name," and "contents information" fields. Note that the site management table 24 may be regarded as information about the websites.

In the site management table 24, the "site name" field contains a name of a website. The "URL" field contains the URL (URI) of the website. The "vender name" field contains the name of the vendor or organization running the website. The "contents information" field is stored with web data provided by the website in time sequence. The contents information has been obtained for accumulation by a process for obtaining contents information shown in FIG. 4, which is executed by the portal site providing machine 20 at regular intervals e.g. once a day, a week, or a fortnight.

Figure 4:
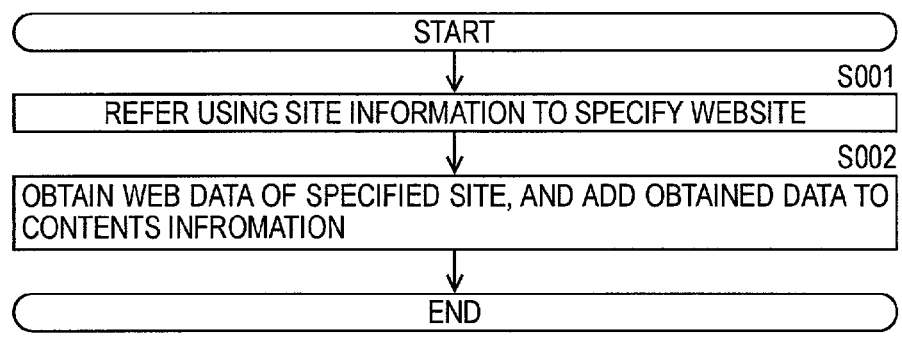
FIG. 4 is a flowchart showing a process for obtaining contents information.

At S001 in FIG. 4 the portal site providing machine 20 refers the using site information in the all records of the user table 23 to specify every website indicated by the using site information.

At the next step S002 the portal site providing machine 20 accesses the websites specified at S001 to obtain the latest web data provided by the respective websites, and adds the obtained web data to the contents information in the records of the site management table 24 corresponding to the specified websites, then terminates the processing.

Figure 5:
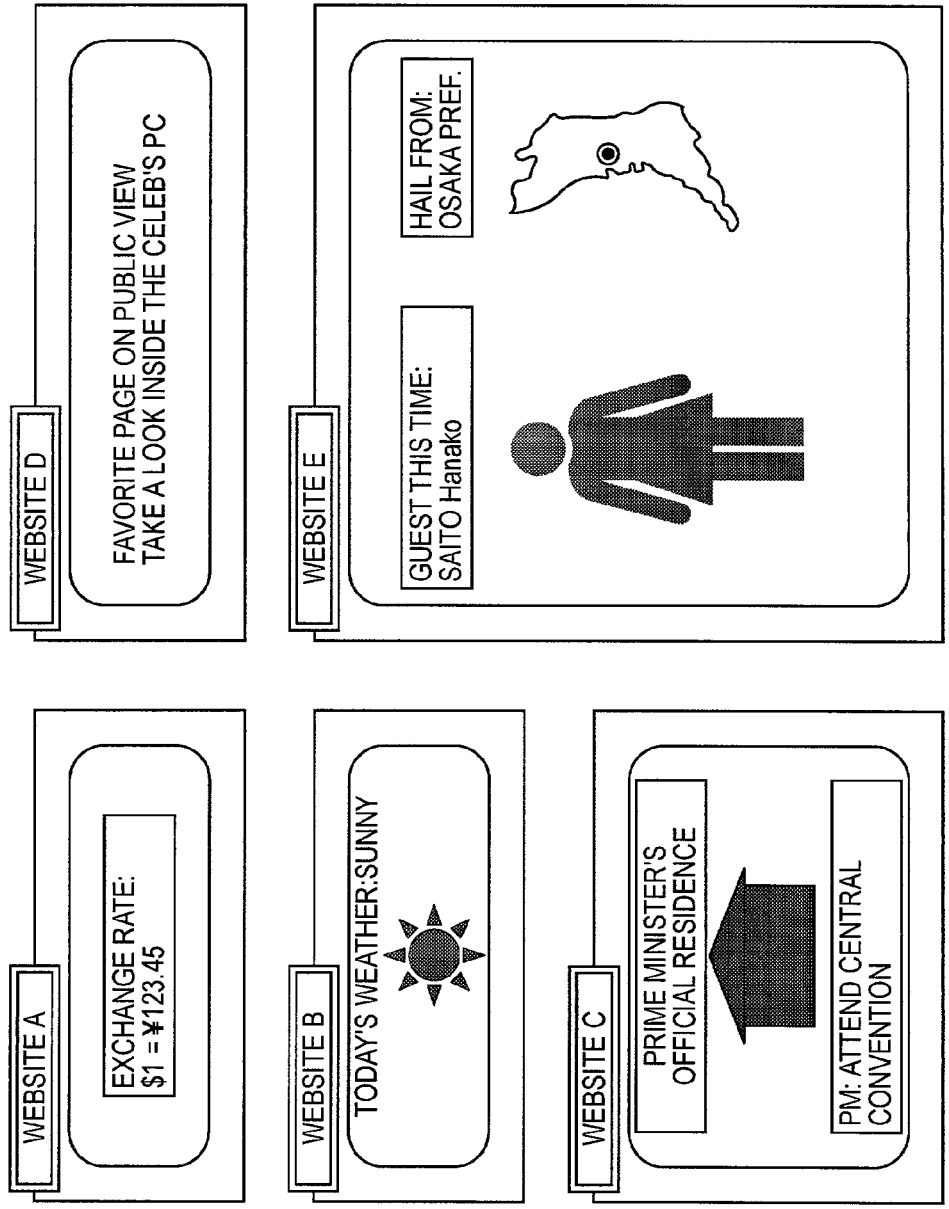
FIG. 5 is a schematic diagram showing the old web data.

FIG. 5 is a schematic diagram showing web data in the websites A–E provided by the web server machines 30A–30E respectively at a certain point in time. The web data in the websites A–E shown in FIG. 5 is obtained by the process shown in FIG. 4, and is added to the contents information in the records of the site management table 24 corresponding to the same websites A–E.

Figure 6:
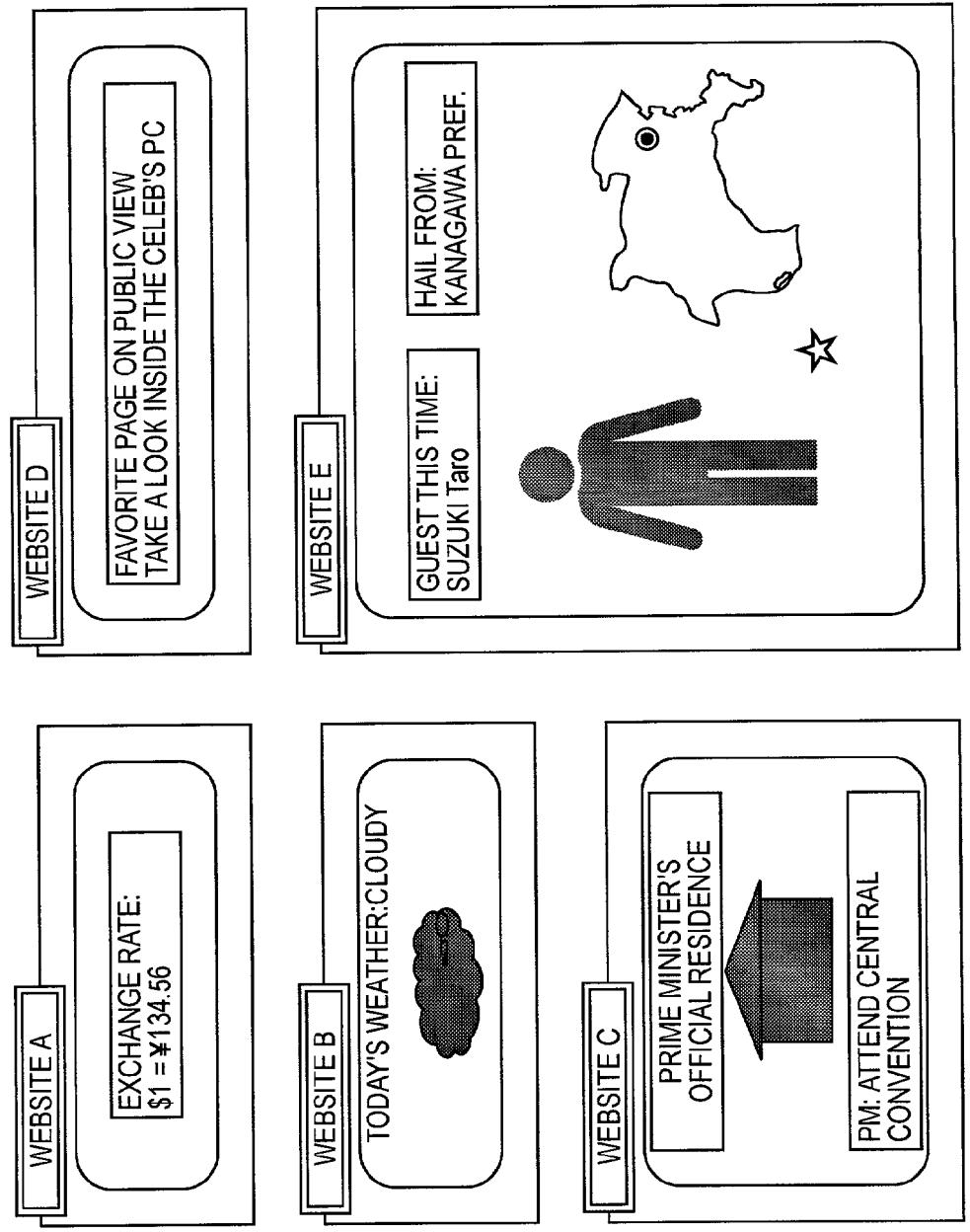
FIG. 6 is a schematic diagram showing the new web data.

When a certain established period has been passed after the web data shown in FIG. 5 is obtained, the web data in the websites A–E shown in FIG. 6 is obtained by the process shown in FIG. 4 being executed again, and is added to the contents information in the records of the site management table 24 corresponding to the websites A–E.

Figure 7:
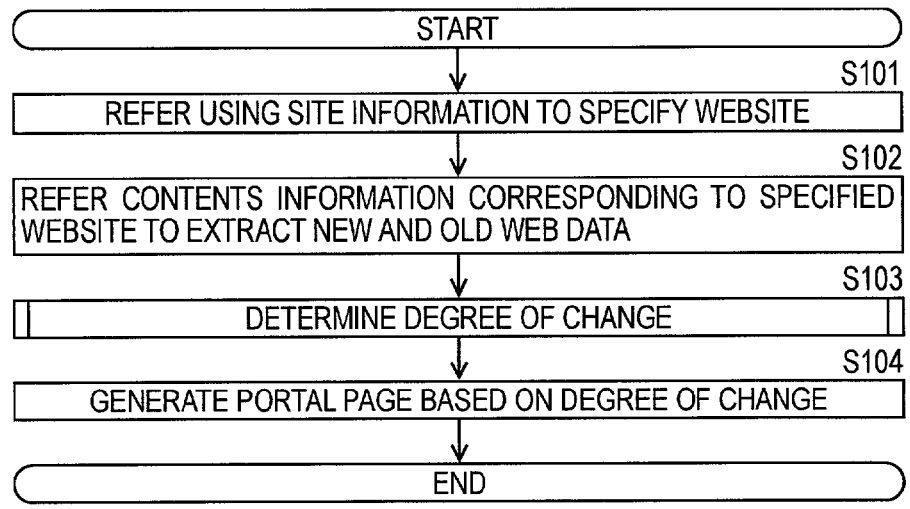
FIG. 7 is a flowchart showing a process for generating the portal page.

Subsequent to that, the portal site providing machine 20 executes a process for generating a portal page. FIG. 7 is a flowchart showing the process for generating the portal page. This generating process is executed on an individual basis for the respective records of the user table 23. That is, the process is executed shown in FIG. 7 corresponding to each user.

At S101 the portal site providing machine 20 refers to the using site information in the record for the processing target in the user table 23 to specify every website indicated by the same using site information. As shown in FIG. 2, for example, when the sites A–E are registered as the using site information, these sites A–E will be specified.

At the next step S102 the portal site providing machine 20 refers the contents information in the records of the site management table 24 corresponding to the sites A–E specified at S101 to extract the latest web data (new web data) and the web data obtained last time (old web data) both of which are included in the contents information.

At the next step S103 the portal site providing machine 20 compares the old and new web data extracted at S102 to determine a degree of change, discussed later, with respect to each one of the websites A–E specified at S101. That is, the portal site providing machine 20 executes a process for obtaining a degree of change shown in the flowchart in FIG. 8 for each one of the sites A–E on an individual basis.

The process for obtaining a degree of change concerning the website A, will hereinafter be described with reference to FIG. 8. At S201 the portal site providing machine 20 compares the old and new web data extracted based on the record corresponding to the site A in the site management table 24 as shown in FIG. 9. The left and right web pages in FIG. 9 correspond to the old and new web data, respectively. The comparison is executed for each item shown in FIG. 10. More specifically, the both web data are compared with respect to each one of the items, "date of updating," "total size," "text entity," "number of images," "image size," and "general pattern."

The "date of updating" is the item concerned with the date on which the web data was updated. The "total size" is the item concerned with the data size of the web data. The "text entity" is the item concerned with the text data in the web data. The "number of images" is the item concerned with the number of the images contained in the web data. The "image size" is the item concerned with the total data size of the all images. The "general pattern" is the item concerned with the color distribution of the web page presented based on the web data.

To the items their respective weights are predetermined. More specifically, the weights "3," "2," "2," "1," "2," and "3" are predetermined to the "date of updating," "total size," "text entity," "number of images," "image size," and "general pattern," respectively.

The portal site providing machine 20 determines "results of comparison" relating to respective items shown in FIG. 10. More specifically, when the new web data matches the old web data with respect to an item, the portal site providing machine 20 sets the result of comparison corresponding to the same item to "1." On the other hand, when the new web data differs from the old web data with respect to the item, the portal site providing machine 20 sets the result of comparison corresponding to the same item to "0."

At the next step S202 the portal site providing machine 20 calculates subtotals each corresponding to an item shown in FIG. 10 by multiplying the result of comparison determined at S201 by the corresponding weight. More specifically, the subtotals of the "date of updating," "total size," "text entity," "number of images," "image size," and "general pattern" are calculated as "3," "2," "2," "0," "0," "0," respectively.

Figure 8:
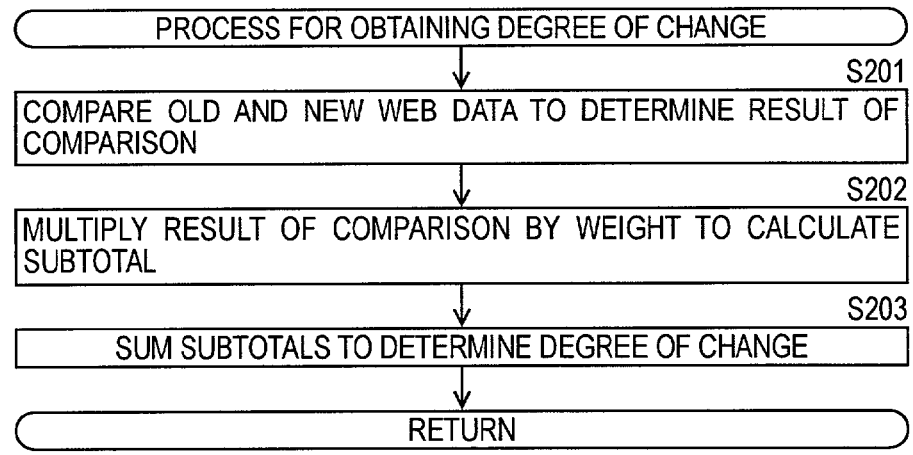
FIG. 8 is a flowchart showing a process for obtaining a degree of change
Figure 9:
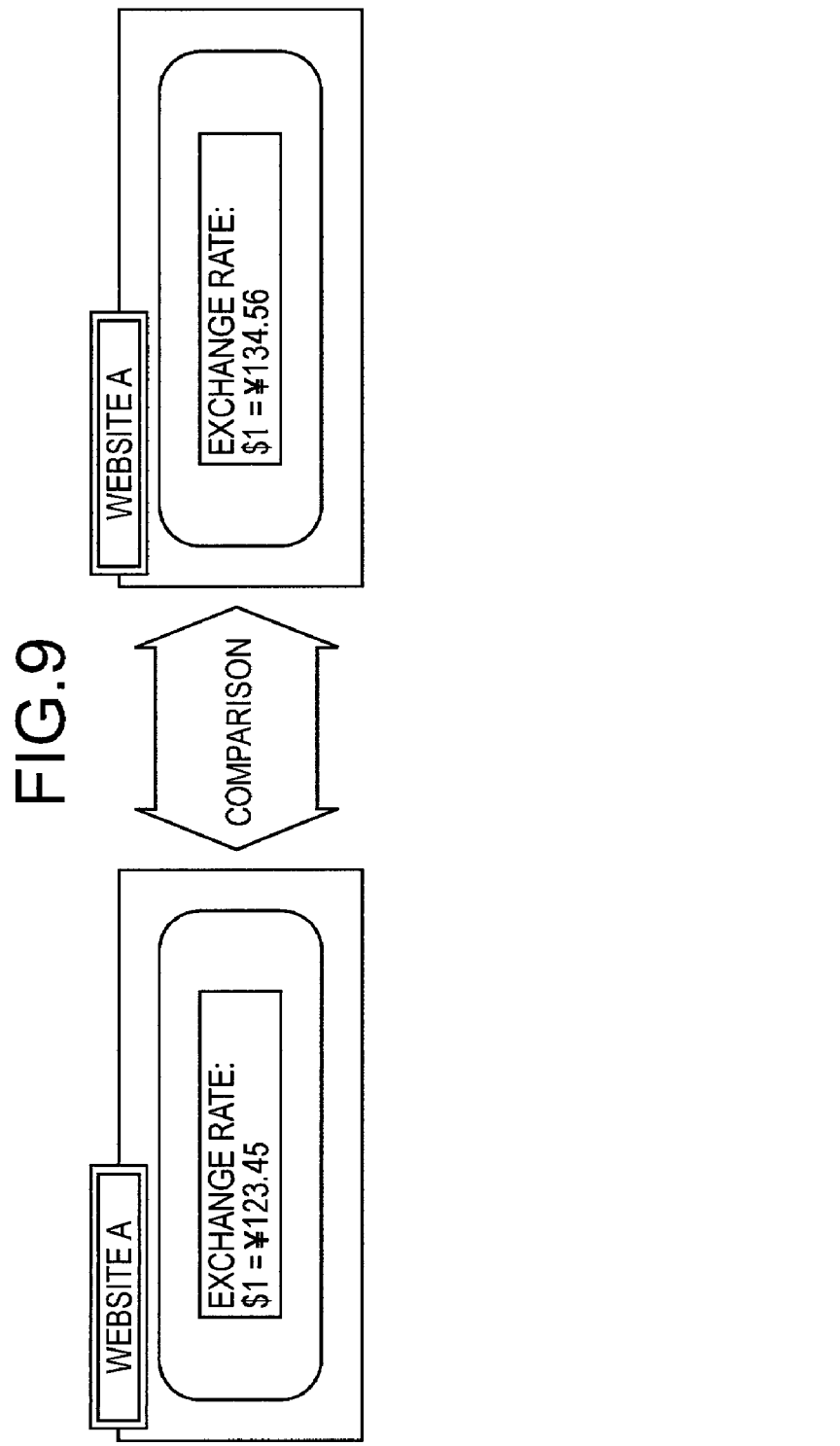
FIG. 9 is a schematic diagram showing comparison in the website A.

At the next step S203 the portal site providing machine 20 sums the subtotals calculated at S202 to determine a degree of change, then terminates the process of the flowchart shown in FIG. 8. As shown in FIG. 10, the degree of change corresponding to the website A is determined as "7."

Figure 11:
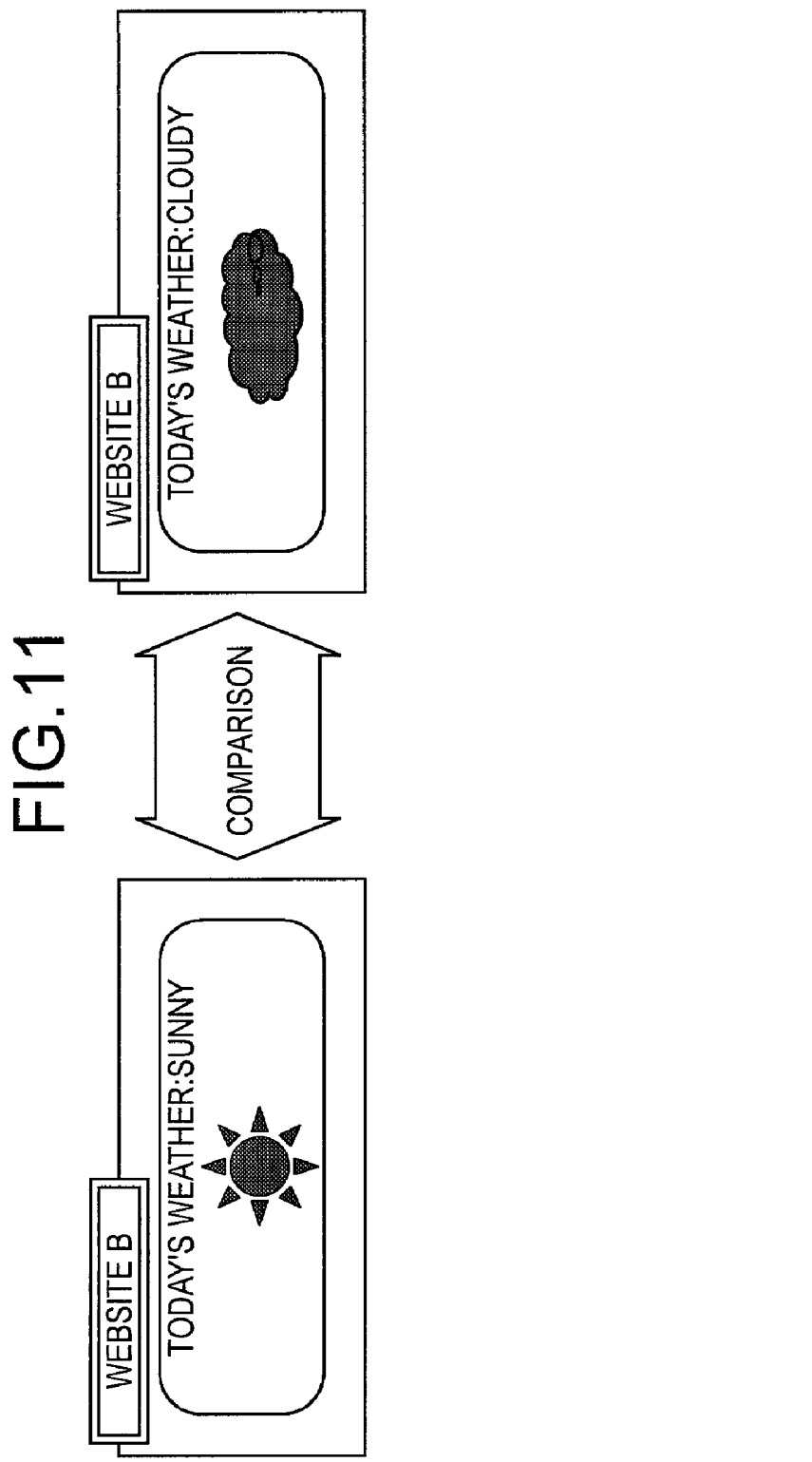
FIG. 11 is a schematic diagram showing comparison in the website B.

Likewise, the process of the flowchart shown in FIG. 8 is executed with respect to the website B. More specifically, the old web data illustrated on the left side and the new data illustrated on the right side in FIG. 11 are compared to determine the degree of change, "12," as shown in FIG. 12.

Figure 13:
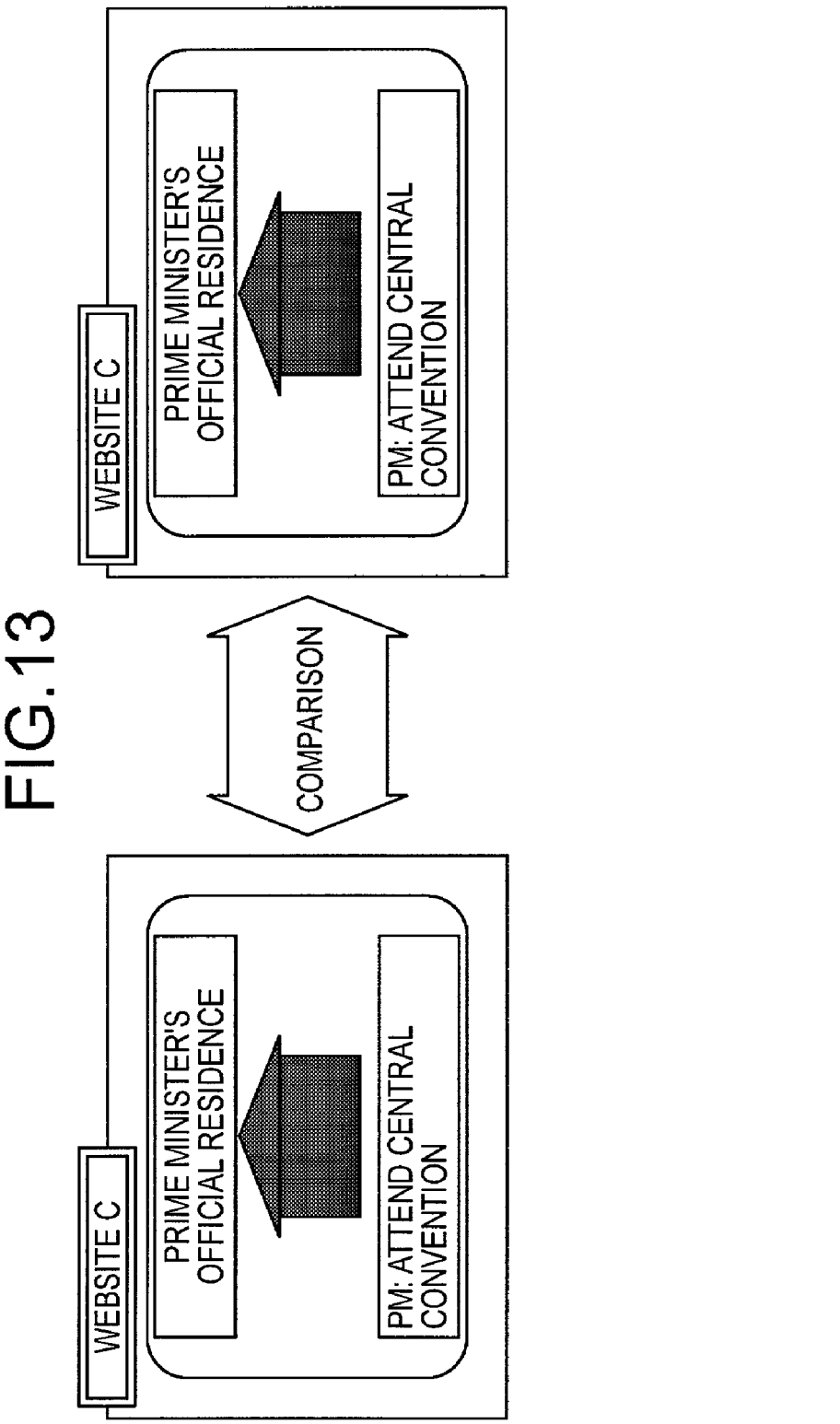
FIG. 13 is a schematic diagram showing comparison in the website C.

Further, the process of the flowchart shown in FIG. 8 is executed with respect to the website C. More specifically, the old web data illustrated on the left side and the new data illustrated on the right side in FIG. 13 are compared to determine the degree of change, "0," as shown in FIG. 14. It should be noted that the new and old web data of the website C are identical each other.

Figure 15:
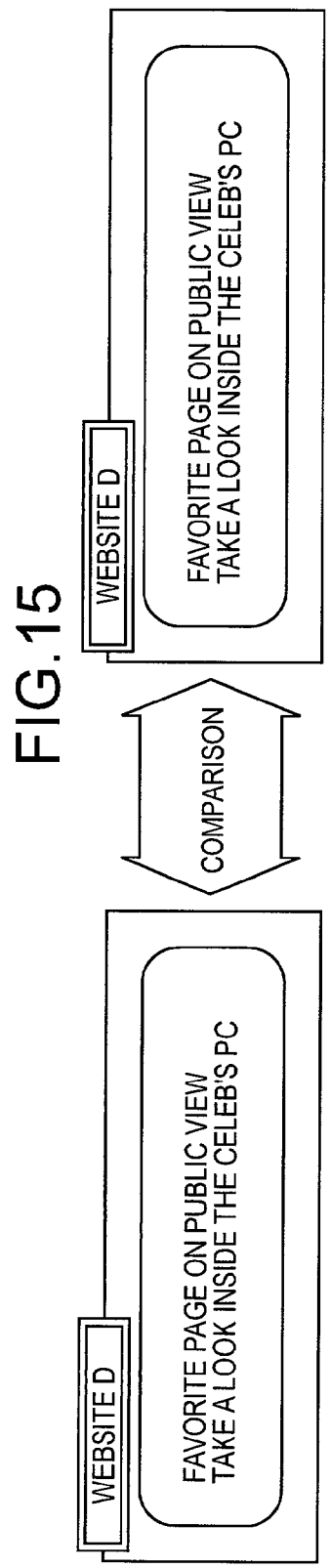
FIG. 15 is a schematic diagram showing comparison in the website D.

Moreover, the process of the flowchart shown in FIG. 8 is executed with respect to the website D. More specifically, the old web data illustrated on the left side and the new data illustrated on the right side in FIG. 15 are compared to determine the degree of change, "0," as shown in FIG. 16. It should be noted that the new and old web data of the website D are identical each other.

Figure 17:
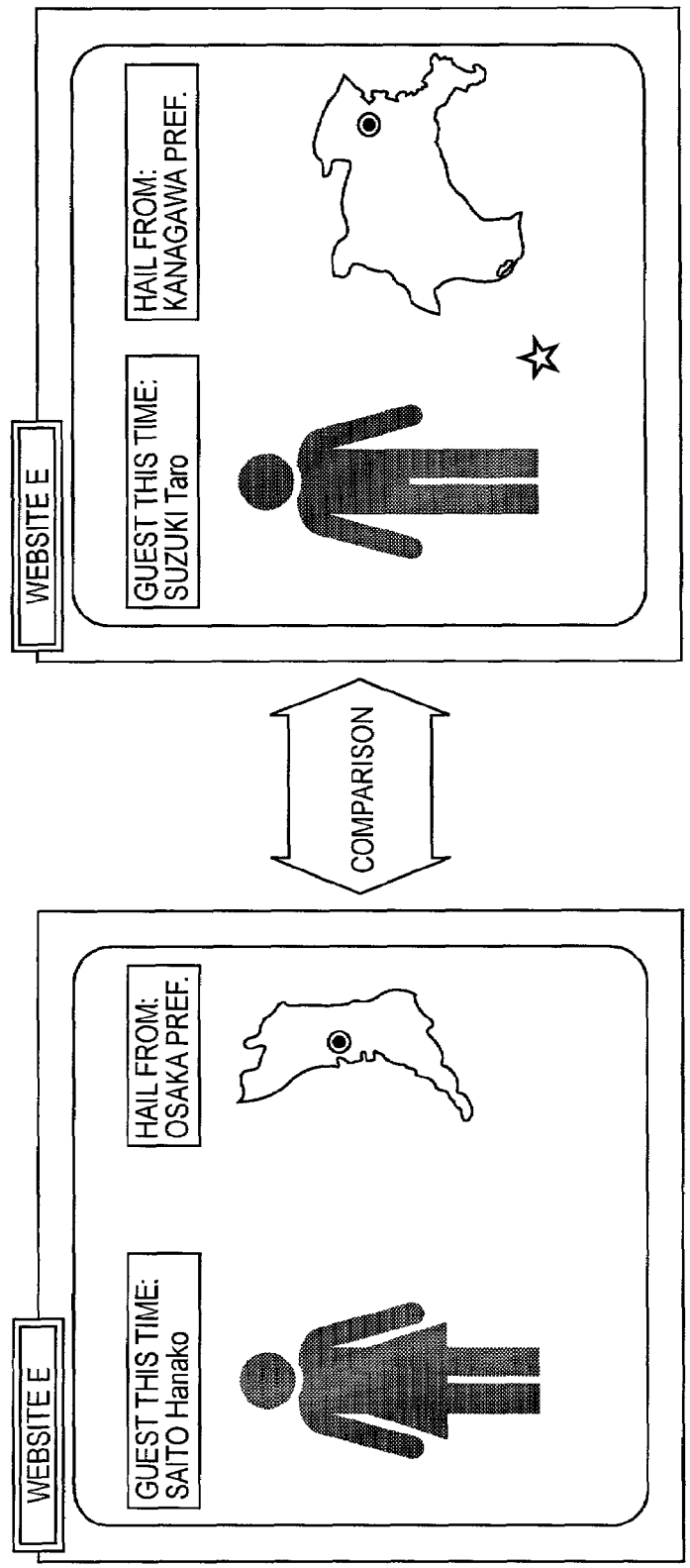
FIG. 17 is a schematic diagram showing comparison in the website E.

Further, the process of the flowchart shown in FIG. 8 is executed with respect to the website E. More specifically, the old web data illustrated on the left side and the new data illustrated on the right side in FIG. 17 are compared to determine the degree of change, "13," as shown in FIG. 18.

As described above, the processes with respect to the websites A–E are executed to determine the degrees of change corresponding to the respective sites A–E. FIG. 19 is a schematic diagram showing the degrees of change corresponding to the websites A–E. After the execution, the portal site providing machine 20 terminates the processing at S103 in FIG. 7.

At the next step S104 the portal site providing machine 20 generates web data for a portal page (FIG. 21) based on the degrees of change corresponding to the websites A–E determined at S103. To be more specific, the portal site providing machine 20 arranges the images representing the new web data of the sites A–E on the basis of the degrees of change to generate the web data for the portal page. Then the portal site providing machine 20 stores the generated web data for the portal page in the HDD 21 establishing association between the web data and the user ID of the corresponding user.

It should be noted that the process shown in FIG. 7 is executed for every user. That is, the process is done shown in FIG. 7 corresponding to each record of the user table 23 on an individual basis.

Figure 20:
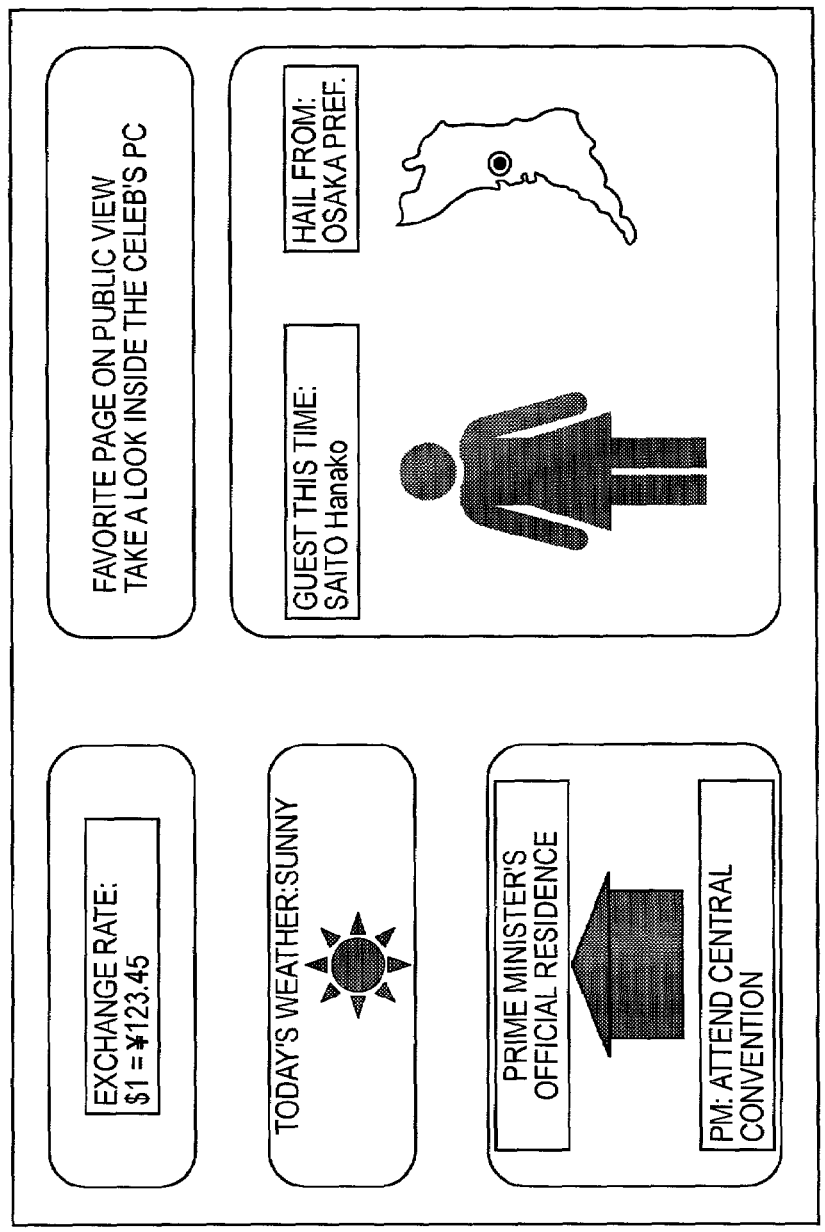
FIG. 20 is a schematic diagram showing an old portal page.

After the execution of the process, when the user accesses the portal site providing machine 20 from the client machine 10, the portal site providing machine 20 finds the web data for the portal page corresponding to the same user, and sends the found web data to the client machine 10. Thereupon the portal page is displayed on the screen of the client machine 10. Even though the portal page shown in FIG. 20 was displayed when the user accessed previously, the portal page shown in FIG. 21 will be displayed when the user accesses again after the execution of the process shown in FIG. 7.

The portal page shown in FIG. 21 contains two frames in the left side and three frames in the right side. In these frames, the images are displayed of the web data provided by the websites E, B, A, C, D. These images are arranged in descending order of the corresponding sites' degrees of change, from the upper-left in FIG. 21 to the lower-left, then the upper-right to the lower-right. Because the degree of change represents the difference between the old web data (the first web data) and the new web data (the second web data), this arrangement means that the web data of the websites A–E is laid out on the basis of the degrees of the updating.

The user therefore recognizes the degrees of updating of the contents in the respective websites A–E registered by himself or herself. Then the user can browse the sites A–E in descending order of the degrees of the updating. It should be noted that the users should only register their using sites with the portal site providing machine 20 to be informed of each site's degree of updating. There is no need for the users to register with each site on an individual basis. That is, the users should only notify their personal information to the portal site providing machine 20, and there is no need for them to notify the information to the web server machines 30A–30E.

According to the description above, the "result of comparison" is set to "0" or "1" as shown in FIG. 10. The present invention is not restricted to this example, but the "result of comparison" can be set to a value from zero to one inclusive with desired precision. In this modification, it is preferable that the "result of comparison" is determined based on pattern matching, text matching, or spectrum analysis. It should be noted that the result of comparison corresponds to an item-specific degree of updating. The number of frames of web data may be considered as an item to determine the degree of change. According to the description above, the process for obtaining contents information shown in FIG. 4, is executed at regular time intervals. The present invention is not restricted to this example, but the process for obtaining contents information may be executed at any time when a request from a user is issued.

Further, the portal site providing machine 20 may summarize the websites' degrees of change in the form as shown in FIG. 19 to generate site updating information. Moreover, the portal site providing machine 20 generates the site updating information as web data. Then the organizer of the portal site providing machine 20 can provide the site updating information for the venders operating the sites A–E to obtain the consideration from the same venders.

According to the portal site providing system of the present invention having the above-described configuration, every user can recognize the registered sites' degrees of updating by browsing the generated web data for the portal site. Consequently, the users can browse the sites in decreasing order of the degrees of updating.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A program product comprising a portal site providing a program embodied in a computer readable medium, said portal site providing a program controlling a server computer, connectable to computers for websites each providing web data and a client computer used for a web browser, comprising a process of:

obtaining program product web data of the website whenever the client computer browses the website;

determining when the obtaining is executed, degrees of updating of the websites' web data by comparing the web data of the website recently obtained in the obtaining, and the web data of the same website obtained immediately before; and generating web data for a portal site in which a thumbnail image based on web data recently obtained in the obtaining and other thumbnail images of other websites based on pieces of web data respectively obtained through the obtaining are arranged in order of the updating degrees of the websites respectively determined in the determining.

2. The program product according to claim 1, wherein in the determining, item-specific degrees of updating about items concerned with texts and images in each website's web data are calculated to determine the degree of change based on the calculated item-specific degrees of updating.

3. The program product according to claim 2, wherein the items concerned with the images include at least items indicating a number of images and a size of the images.

4. The program product according to claim 2, wherein the items include an item representing distribution of color in a web page presented based on the web data.

5. The program product according to claim 1, wherein the portal site providing program controls the server computer to further execute:
 summarizing the websites' degrees of change to generate site updating information.

6. The program product according to claim 5, wherein the portal site providing program controls the server computer to further execute:
 providing the websites with the site updating information generated in the summarizing step.

7. A portal site providing method actualized by a server computer connectable to computers for websites each providing web data and a client computer used for a web browser, comprising:
 obtaining web data of the website whenever the client computer browses the website;
 determining when the obtaining is executed, degrees of updating of the websites' web data by comparing the web data of the website obtained in the obtaining, recently executed and the web data of the same website obtained in the obtaining executed immediately before; and
 generating web data for a portal site in which a thumbnail image based on the web data recently obtained in the obtaining and other thumbnail images of other websites based on pieces of web data respectively obtained through the obtaining are arranged in order of the updating degrees of the websites respectively determined in the determining.

8. The method according to claim 7, wherein in the determining, item-specific degrees of updating about items concerned with texts and images in each website's web data are calculated to determine the degree of change based on the calculated item-specific degrees of updating.

9. The method according to claim 8, wherein the items concerned with the images include at least items indicating a number of images and a size of the images.

10. The method according to claim 8, wherein the items include an item representing distribution of color in a web page presented based on the web data.

11. The method according to claim 7, further comprising: summarizing the websites' degrees of change to generate site updating information.

12. The method according to claim 11, further comprising:
 providing the websites with the site updating information generated in the summarizing step.

13. A portal site providing system, comprising:
 a server computer connectable to computers for websites each providing web data and a client computer used for a web browser; and
 a portal site providing program stored with a storing device, said portal site providing program controlling said server computer to execute the following operations:
 obtaining web data of the website whenever the client computer browses the website;
 determining when the obtaining is executed degrees of updating of the websites' web data by comparing the web data of the website obtained in the obtaining, recently executed and the web data of the same website obtained in the obtaining executed immediately before; and
 generating web data for a portal site in which a thumbnail image based on the web data recently obtained in the obtaining and other thumbnail images of other websites based on pieces of web data respectively obtained through the obtaining are arranged in order of the updating degrees of the websites respectively determined in the determining.

14. The system according to claim 13, wherein in the determining, item-specific degrees of updating about items concerned with texts and images in each website's web data are calculated to determine the degree of change based on the calculated item-specific degrees of updating.

15. The system according to claim 14, wherein the items concerned with the images include at least items indicating a number of images and a size of the images.

16. The system according to claim 14, wherein the items include an item representing distribution of color in a web page presented based on the web data.

17. The system according to claim 13, wherein the portal site providing program controls the server computer to further execute:
 summarizing the websites' degrees of change to generate site updating information.

18. The system according to claim 17, wherein the portal site providing program controls the server computer to further execute:
 providing the websites with the site updating information generated in the summarizing.

19. A portal site providing system, comprising:
 a server computer connectable to computers for websites each providing web data and a client computer used for a web browser;
 means for obtaining web data of the websites;
 means for determining degrees of updating of the websites' web data; and
 means for generating web data for a portal site in which an image based on the web data obtained and other images of other websites based on pieces of web data obtained are arranged in order of the updating degrees of the websites.

20. A portal site providing system according to claim 19, wherein the arranged pieces of web data obtained arranged in order of the updating degrees of the websites are at least one of date of updating, total size, text entity, number of images, image size, or general pattern.

21. A method of operating a portal site provided by a server computer connectable to website computers, each providing web data, and a client computer running a web browser, comprising:
 obtaining the web data of each website whenever the client computer browses the website;
 determining, when the web data is obtained, degrees of updating of the web data by comparing recent web data obtained during a recent browsing of a corresponding website with previous web data obtained during an immediately preceding browsing of the corresponding website; and
 generating thumbnail images for the portal site based on the recent web data obtained for each of the websites arranged in order of the updating degrees of the web data for each of the websites.

* * * * *